United States Patent Office 3,298,860
Patented Jan. 17, 1967

3,298,860
COATING METAL WITH A CLAYLESS SUSPENSION OF CERAMIC SLIPS
Eugene E. Bryant, Cleveland, and Albert L. Gugeler, Northfield, Ohio, assignors to Ferro Corporation, Cleveland, Ohio
No Drawing. Filed Mar. 28, 1963, Ser. No. 268,574
5 Claims. (Cl. 117—129)

This invention relates generally to ceramic slips, and more particularly to a means for suspending ceramic glaze and porcelain enamel frits in a slip form, without the use of clays.

Throughout the history of the ceramic industry, the traditional practice followed in applying vitrifiable coatings to ceramic or metallic substrates has been via the medium of a liquid suspension, preferably utilizing water as the suspending medium.

As is well known, one of the most popular methods for applying a vitrifiable coating to either ceramic or metallic substrates, has been through the medium of an aqueous suspension of a fritted vitrifiable material (commonly referred to as "frit") in the form of a slip, which is either sprayed, slushed, or applied by dipping, to a given substrate.

Ceramic slip suspensions have been commonly achieved by charging a ball mill with frit, plus various electrolytes for imparting the required rheological properties to the milled slip, with suspending agents such as clay or colloidal silica which function in cooperation with electrolytes to keep the milled fritted particles in suspension; after the foregoing have been charged into a ball mill, along with the required amount of water, the entire mass is milled for several hours which thoroughly disperses all the mill added components, commonly referred to as "mill additions" into a finely divided state, thoroughly and homogeneously dispersed and suspended throughout the aqueous medium.

Heretofore, if either the broad class of electrolytes, as will be hereinafter described, or suspending agents such as clays or colloidal silica, were utilized independently, in the absence of the other, the proper degree of suspension could never be achieved.

However, the previous use of clays and/or colloidal silica as suspending agents in combination with electrolytes, have always presented serious difficulties. For example, the presence of clay in an enamel, has a tendency to reduce its acid resistance and impart a dirty, off-white, to what would otherwise be a clean white coating, when a white is desired. This dirtying effect, when pigments are added to the slip for coloration, tends to mask a clean color expect from said pigments when pastel shades are desired. Too, clay being in the nature of a refractory material, when used in the mill has a tendency to elevate the maturing and fusing temperature of an enamel anywhere from 10° F. to 20° F., thus necessitating increased heat in furnaces and kilns designed to fire porcelain enamel and ceramics. Such elevated firing temperatures required for firing an enamel when clay is present, besides increasing operating costs, necessitate added bracing, particularly in a situation involving enameling of sheet steel, in order to avoid or minimize warpage and distortion of metal at elevated temperatures.

While the reduced acid resistance imparted by clays is not so much an undesirable factor in sheet steel porcelain enamel groundcoats, since they are generally ultimately cover coated, the presence of clays still has a tendency to increase the firing temperature required in order to mature the groundcoat. Furthermore, there are some instances wherein groundcoats, containing adherence promoting cobalt, nickel or manganese oxides, might be subjected to acid action, as in the case of a groundcoating on an automobile muffler. Obviously, the reduced acid resistance imparted by the presence of clay shortens the life of such coating.

While colloidal silica as a suspending agent does not have so much of a tendency to reduce acid resistance, the presence of colloidal silica in sheet steel covercoats, designed to be applied over a groundcoat, still has a tendency to elevate the firing temperature by virtue of the refractoriness of the colloidal silica. Furthermore, colloidal silica has not been found suitable as a complete replacement for clay as a suspending agent, so clay is usually present with colloidal silica, bringing with it reduced acid resistance.

One of the requirements of a good suspending agent is that it also imparts some green strength to the bisque, or at least, not detract from it. Colloidal silica has been found most deficient in this respect.

It is therefore, an object of this invention to provide a method for producing a useful, workable frit slip suspension, adaptable to be applied either by spraying, dipping or slushing to a substrate, which slip suspension of said frit is substantially free of the presence of the clay as the primary suspending agent.

It is also an object of this invention to provide means for applying a ceramic frit slip suspension to a substrate without having to depend on clay as a suspension agent for said frit.

It is also an object of this invention to provide a method for applying and fusing on a substrate, a ceramic frit suspension, which slip suspension was substantially free of clay.

It is a further object of this invention to provide a composition of matter comprising a ceramic frit slip suspension which slip suspension is substantially free of clay.

It is another object of this invention to provide a substrate on which has been fused a frit applied in slip suspension which slip suspension was substantially free of clay.

Other related objects will become apparent as the description proceeds.

Briefly stated, this invention involves the total or partial replacement of clay in ceramic slips by substituting in lieu thereof zinc oxide, as a suspending agent.

The advantages of replacing clay with zinc oxide will become apparent from the following examples of variations of our preferred embodiment of this invention.

EXAMPLE I

In order to illustrate the absolutely essential nature of a suspending agent, such as either clay or zinc oxide, the following mill additions were set up:

| Titanium Opacified Frit X | 100 Parts by Wt. | 100 Parts by Wt. | 100 Parts by Wt. |
|---|---|---|---|
| Clay | 3 | | |
| Bentonite | ½ | ½ | ½ |
| MgCO$_3$ | ¹⁄₁₆ | ¹⁄₁₆ | ¹⁄₁₆ |
| KCl | ¹⁄₁₆ | ¹⁄₁₆ | ¹⁄₁₆ |
| Sodium Aluminate | ⅛ | ⅛ | ⅛ |
| Setit A* | ¹⁄₃₂ | ¹⁄₃₂ | ¹⁄₃₂ |
| Gum Tragacanth | ¹⁄₃₂ | ¹⁄₃₂ | ¹⁄₃₂ |
| NaNO$_2$ | ¹⁄₃₂ | ¹⁄₃₂ | ¹⁄₃₂ |
| ZnO** | | 2 | |
| Water | 40 | 40 | 40 |

*Setit A is hydrated alumina containing 48.2% Al$_2$O$_3$; 51.1% ignition loss. Approximate oxide analysis:

|  | Percent |
|---|---|
| Al$_2$O$_3$ | 48.2 |
| SiO$_2$ | 0.30 |
| TiO$_2$ | 0.03 |
| Fe$_2$O$_3$ | 0.02 |
| CaO | 0.30 |
| MgO | 0.10 |
| Na$_2$O | 0.005 |
| V$_2$O$_5$ | 0.001 |
| PbO | 0.002 |
| Ignition Loss | 51.1 |

**Pigmentary zinc oxide of the type normally used by enamelers.

The foregoing mill additions were milled in conventional ball mills and applied, using conventional procedures, to a previously ground coated sheet steel workpiece, and fired to fusion thereon.

Table I below sets forth the temperature at which the foregoing millings were fired to fusion on the groundcoated workpieces, following drying, utilizing conventional firing times and equipment.

*Table I*

| Firing Temperature | A | | | | B | | | | C | | | |
|---|---|---|---|---|---|---|---|---|---|---|---|---|
| | Color and Reflectance* | | | AR Percent | Color and Reflectance | | | AR Percent | Color and Reflectance | | | AR Percent |
| | Rd | a | b | | Rd | a | b | | Rd | a | b | |
| 1440° F | 76.3 | −0.1 | −1.0 | A− | 85.8 | −0.5 | −0.5 | AA | 81.7 | −0.2 | −2.5 | AA |
| 1390° F | 77.0 | −0.6 | −2.1 | A− | 84.2 | −0.5 | −2.5 | AA | 81.6 | −1.0 | −3.4 | AA |
| 1340° F | 76.6 | −1.1 | −2.8 | A− | 83.5 | −1.1 | −2.9 | A+ | 81.1 | −1.2 | −3.2 | AA |

*Values from Gardner Color-Difference Meter Model AC-2a, Series 200, manufactured by Gardner Laboratory, Inc., Bethesda 14, Maryland. Operation and specifications as described in Gardner Bulletin PH 261-B. Briefly, Rd indicates reflectance or "whiteness" based on an MgO standard; "a" indicates redness-greenness, a "+a" indicating redness, "b" indicates yellowness-blueness, a "+b" indicating a more yellow-white (creamy) than bluewhite.

From the foregoing Table I it will be readily apparent that the clay mill addition utilizing clay as the sole suspending agent showed vastly inferior acid resistance to the zinc oxide suspended enamel, over the entire firing range. The designation of acid resistance, such as A−, A+ and AA is based upon the ASTM test C282–61T. It will also be seen that the R$d$ reading of the zinc oxide suspended slip was substantially higher than the clay suspended slip, illustrating quite vividly the high degree of superiority from the standpoint of percent reflectance, or whiteness, achieved by zinc oxide substituted for clay.

Not apparent from Table I is the fact that the clayless-zincless mill addition was completely unworkable. The milling time for C was substantially longer than for A or B, to achieve the same degree of particle size reduction and distribution. The mill was extremely difficult to discharge because of the almost immediate tendency of the particles to settle out of suspension, thus rendering the milled material of C unqualified to be characterized as a "slip." It was impossible to evenly spray C due to the settling tendency and lack of "set" in the absence of either clay or some suitable substitute. The enamel sheet sprayed with mill addition C had extremely poor bisque strength as evidenced by a decided tendency to tear and crawl during firing.

Mill additions A and B on the other hand, were extremely easily handled throughout dumping the mill and application by spraying. A and B showed excellent surface after firing.

After storing slips A, B and C overnight, the millings A and B still displayed excellent suspension, whereas milling C had settled almost completely, and was practically impossible to resuspend since it had formed a very hard, dense cake of frit particles in the bottom of the container.

Thus, Table I establishes superiority of a zinc oxide suspended frit slip over clay, and over a mill addition having neither clay nor zinc oxide.

Incidentally, it is also significant to note that bentonite, which is occasionally regarded as an auxiliary suspending agent, imparted little or no desirable suspension qualities to slip C, in the absence of either clay or zinc oxide.

The titanium frit X used in the foregoing Table I had the following composition:

TITANIUM FRIT X

| Oxide | Oxides Parts by Wt. | Oxide Analysis, Wt. Percent |
|---|---|---|
| $SiO_2$ | 1,059 | 40.0 |
| $B_2O_3$ | 435 | 16.5 |
| $P_2O_5$ | 19 | 0.7 |
| $Na_2O$ | 267 | 10.4 |
| $K_2O$ | 133 | 5.1 |
| $Li_2O$ | 23 | 0.9 |
| $F_2$ | 131 | 5.0 |
| $TiO_2$ | 530 | 20.0 |
| $ZrO_2$ | 39 | 1.5 |
| Total | 2,636 | 100.1 |

The foregoing oxide percent composition represents a titanium opacified frit produced according to standard smelting (2250° F.) and quenching procedures, well known in the art, utilizing conventional vitrifiable raw material sources for the various oxides.

For certain applications for use with cover coats intended to be applied over grounds, the clay content may be reduced to 2½ parts by weight, or less, with the substitution of ZnO for that part of the clay eliminated.

EXAMPLE II

To illustrate the versatility of zinc oxide as a suspending agent while varying the kinds and amounts of electrolytes used in conjunction therewith, the mill additions set up as shown in the following Table II were tested.

*Table II*

| | Total Electrolytes Held Constant | | | | | | Total Electrolytes Varying | | | | | |
|---|---|---|---|---|---|---|---|---|---|---|---|---|
| | A | B | C | D | E | F | G | H | I | J | K | L |
| $TiO_2$ Frit X | 100 | 100 | 100 | 100 | 100 | 100 | 100 | 100 | 100 | 100 | 100 | 100 |
| Bentonite | ½ | ½ | ½ | ½ | ½ | ½ | ½ | ½ | ½ | ½ | ½ | ½ |
| $MgCO_3$ | ½ | | 1/16 | | 1/16 | | 1/16 | 1/16 | 1/16 | 1/16 | 1/16 | ⅛ |
| Sod. Aluminate | 1/16 | | 1/16 | | | | ⅛ | ⅛ | ⅛ | ¼ | ⅛ | ⅛ |
| Setit A | 1/64 | 1/64 | 1/64 | 1/64 | 1/64 | 1/64 | 1/32 | 1/32 | 1/32 | 1/32 | 1/32 | 1/32 |
| Gum Tragacanth | 1/64 | 1/64 | 1/64 | 1/64 | 1/64 | 1/64 | 1/32 | 1/32 | 1/32 | 1/32 | 1/32 | 1/32 |
| $NaNO_2$ | 1/16 | 1/16 | 1/32 | 1/32 | 1/32 | 1/32 | 1/32 | 1/32 | 1/32 | 1/32 | 1/32 | 1/32 |
| $K_2CO_3$ | | ⅛ | ⅛ | ⅛ | ⅛ | ⅛ | 1/16 | 1/16 | 1/16 | 1/16 | ⅛ | ⅛ |
| KCl | | 1/16 | 1/32 | ¼ | ¼ | ⅛ | 1/16 | 1/16 | 1/16 | ⅛ | ⅛ | ⅛ |
| $KNO_2$ | | | | 1/16 | | 1/16 | | 1/16 | 1/16 | ⅛ | ⅛ | ⅛ |
| ZnO | 2 | 2 | 2 | 2 | 2 | 2 | 2 | 2 | 2 | 2 | 2 | 2 |
| Water | 41 | 41 | 41 | 41 | 41 | 41 | 41 | 41 | 41 | 41 | 41 | 41 |

(All foregoing expressed as parts by weight.)

Milling A through F varied the types and amounts of various, individual electrolytes, maintaining the total quantity of electrolytes constant.

Millings G through L again involved a variation of the types and amounts of electrolytes, at the same time varying the total quantity of electrolytes present.

In applying the mill additions of Table II to previously ground coated test sheets, following the procedures under Example I as to firing range, temperatures, etc., all had cleaner color, higher reflectance, and superior acid resistance to the standard clay milling A of Table I. All the slips of Table II displayed excellent extended suspension and workability. Table III below sets forth reflectance and acid resistance data for millings A through L of Table II.

Table IV

| | A, Clay Milling | B, Zinc Milling | C, Clayless-Zincless Milling |
|---|---|---|---|
| Frit Y, Parts by Wt | 100 | 100 | 100 |
| Clay | 4 | | |
| Bentonite | 3/8 | 3/8 | 3/8 |
| K₂CO₃ | 1/8 | 1/8 | 1/8 |
| MgCO₃ | 1/8 | 1/8 | 1/8 |
| Red Oxide Pigment | 4 | 4 | 4 |
| ZnO | | 2 | |
| Water | 42 | 42 | 42 |

The mill additions in Table IV were milled using conventional methods and equipment, and applied to con- Table III

| | A | B | C | D | E | F | G | H | I | J | K | L |
|---|---|---|---|---|---|---|---|---|---|---|---|---|
| 1,340°: | | | | | | | | | | | | |
| Rd | 81.3 | 80.9 | 82.3 | 84.8 | 84.3 | 85.3 | 81.2 | 80.8 | 81.5 | 81.0 | 84.7 | 82.0 |
| a | −1.4 | −1.7 | −1.5 | −1.4 | −1.5 | −1.3 | −1.6 | −1.6 | −1.8 | −2.1 | −1.0 | −1.7 |
| b | −3.6 | −3.8 | −3.5 | −2.6 | −3.0 | −2.5 | −3.8 | −4.1 | −4.2 | −3.5 | −2.6 | −3.9 |
| 1,390°: | | | | | | | | | | | | |
| Rd | 81.6 | 81.4 | 83.5 | 85.4 | 85.9 | 85.7 | 82.2 | 81.5 | 82.5 | 83.0 | 84.0 | 84.2 |
| a | −0.8 | −1.3 | −1.1 | −1.1 | −0.8 | −1.4 | −1.4 | −1.2 | −1.0 | −1.6 | −1.2 | −1.1 |
| b | −3.2 | −3.2 | −2.6 | −2.0 | −1.8 | −2.0 | −3.3 | −3.3 | −2.9 | −3.2 | −2.7 | −2.6 |
| 1,440°: | | | | | | | | | | | | |
| Rd | 82.1 | 81.8 | 84.5 | 85.5 | 86.1 | 86.5 | 83.0 | 81.2 | 82.2 | 83.0 | 85.2 | 85.0 |
| a | −0.2 | −0.9 | −0.5 | −0.9 | −0.7 | −0.6 | −0.5 | −1.0 | −1.0 | −1.1 | −0.6 | −0.6 |
| b | −2.2 | −2.5 | −1.8 | −1.6 | −1.0 | −1.0 | −2.1 | −2.9 | −2.8 | −2.8 | −1.3 | −1.4 |
| Acid Resistance: | | | | | | | | | | | | |
| 1,340° | A | A | A | A | A | A | A | A | A | A | A | A |
| 1,390° | A | AA | AA | A | A | A | A | AA | A | A | A | A |
| 1,440° | A | AA | AA | A | A | A | AA | AA | AA | A | A | A |

EXAMPLE III

To demonstrate the superiority of the zinc oxide suspension substitute for clay, a frit, known in the art as a "clear glass" for use with mill added pigments for achieving deeper colors such as reds, blues, etc., was smelted at 2300° F., using conventional raw materials and smelting and quenching equipment, having the following oxide composition.

FRIT Y

| Oxide: | Oxide, weight percent |
|---|---|
| $SiO_2$ | 52.5 |
| $B_2O_3$ | 10.6 |
| $Na_2O$ | 19.0 |
| $K_2O$ | 1.6 |
| $Al_2O_3$ | 1.8 |
| $TiO_2$ | 9.3 |
| $F_2$ | 5.7 |
| Total | 100.5 |

Mill additions A, B and C were set up with frit Y in accordance with Table IV below:

ventionally groundcoated steel workpieces in the usual manner, dried and fired over a firing range of 1440° F. to 1500° F. as illustrated in Table V.

Table V

| Firing Temperature | A | | | | B | | | | C | | | |
|---|---|---|---|---|---|---|---|---|---|---|---|---|
| | Color and Reflectance | | | AR Percent | Color and Reflectance | | | AR Percent | Color and Reflectance | | | AR Percent |
| | Rd | a | b | | Rd | a | b | | Rd | a | b | |
| 1,400° F | 4.0 | +53.5 | +12.8 | B+ | 4.5 | +53.0 | +11.5 | B+ | 3.5 | +37.0 | +9.4 | B+ |
| 1,450° F | 4.5 | +53.0 | +12.9 | B+ | 5.0 | +53.0 | +13.3 | B+ | 4.0 | +35.0 | +11.0 | B+ |
| 1,500° F | 4.3 | +53.0 | +11.2 | B+ | 5.0 | +53.0 | +13.9 | B+ | 3.5 | +35.2 | +9.4 | B+ |

Table V illustrates the results achieved in applying and firing the foregoing millings to standard workpieces.

As is the case of the titanium frit, the clayless-zincless mill addition was practically unworkable, while millings A and B showed good workability and suspension qualities. From Table V it will be seen that the dirtying effect of the clay has been eliminated in milling B giving us a higher reflectance reading with the acid resistance level being maintained about constant. Table V demonstrates that zinc oxide is a compatible substitute for clay in a clear type frit, in addition to a titanium opacified frit for whites and pastels. The color readings for milling C of Table V cannot be relied upon completely as an indication of acceptable appearance, as the surface was very poor.

EXAMPLE IV

The following groundcoat frit was manufactured using conventional smelting and quenching equipment, smelted at a temperature of approximately 2300° F., utilizing conventional vitrifiable raw batch materials to produce a frit having the final oxide analysis listed below.

FRIT Z

| Oxide: | Oxide, weight percent |
|---|---|
| $SiO_2$ | 44.5 |
| $B_2O_3$ | 17.9 |
| $Na_2O$ | 17.5 |
| $K_2O$ | 3.7 |
| $CaO$ | 4.9 |
| $NiO$ | 0.6 |
| $Co_2O_3$ | 0.7 |
| $F_2$ | 2.1 |
| $Al_2O_3$ | 7.1 |
| $MnO_2$ | 1.6 |
| Total | 100.6 |

Groundcoat frit Z was set up in mills, as shown in Table VI.

*Table VI*

| | A | B | C | D |
|---|---|---|---|---|
| Ground Coat Frit Z, Parts by Wt. | 100 | 100 | 100 | 100 |
| Feldspar | 5 | 5 | 5 | 5 |
| Borax | 1/8 | 1/8 | 1/8 | 1/8 |
| $BaCl_2$ | 1/16 | 1/16 | 1/16 | 1/16 |
| Clay | 7 | 2 | | |
| ZnO | | 4 | 5 | |
| Water | 42 | 41 | 40 | 40 |

The foregoing mill additions were milled in conventional equipment to a slip suspension and applied directly to conventionally pickled steel substrates by dipping, and fired at 1500° F. for 3½ minutes.

Milling D had absolutely no set suspension and could not be applied to the workpiece by dipping. Millings A, B and C all suspended well and drained well during dipping for application.

Table VI illustrates that substitution of zinc for clay, either totally or partially, provides excellent results when applied in conjunction with a groundcoat frit containing adherence promoting oxides such as cobalt, nickel and manganese, for application directly to a steel substrate as a groundcoat.

It will be noted here that clay, while undesirable in large percentages, may occasionally still be advisable for the purpose of imparting certain qualities to the milled slip, such as groundcoat in this case, wherein the clay was utilized to provide a certain amount of bubble structure found beneficial for many groundcoat applications.

Again, however, even in milling B above, zinc oxide was obviously the primary suspending agent since at four parts per weight based on the weight of frit, it has been previously established that zinc oxide is an excellent suspending agent in the complete absence of clay.

Thus, in addition to involving a complete substitution of zinc oxide for clay, our invention also contemplates major reductions in clay, with substitution of zinc oxide in lieu of the reduced amount of clay, said zinc oxide present as the primary suspending agent.

Thus, generalizing, we have found that in both over coats and ground coats, zinc oxide may be used as a total substitution for clay, completely eliminating clay from the mill addition. Furthermore, whereas the clay content of covercoats is normally in the range of 4 to 5%, and the clay content of groundcoats intended for direct application to sheet steel is in the range of 6 to 7%, our invention further contemplates, and is found to reside in, the use of zinc oxide as a primary suspending agent in cover coats in combination with 2½% or less of clay, and in groundcoats with 3½% or less of clay, depending upon the ultimate rheological properties desired in the milled slip.

While the foregoing working examples show a number of electrolytes used as mill additions, as is well known, a wide selection of electrolytes are available to the enameler and could be adapted to function just as readily, achieve substantially the same results, in applicant's invention as those shown in the working examples. Exemplary of various other electrolytes useful with our invention, in addition to those listed in the foregoing examples, are:

Potassium nitrate   Potassium chlorate
Sodium carbonate   Urea
Sodium chloride   Barium carbonate
Sodium nitrate   Magnesium sulphate
Sodium acetate   Calcium chloride
Potassium acetate   Calcium carbonate
Sodium chlorate   Barium sulphate Although zinc oxide has been used previously in mill additions for various purposes, such as an aid to opacification, or pigment supplement to provide improved color when pigments are used, until our discovery, no one has utilized, or recognized, zinc oxide as a suspending agent either in combination with greatly reduced clay in a mill addition, or as a complete substitute for clay.

Because of the similarity between ceramic frits intended for application to sheet steel in the form of porcelain enamel, and ceramic frits for application to ceramic bodies for forming a glaze thereon, it can be readily seen that the principle of our invention would apply equally to both ceramic glaze slip suspensions and porcelain enamel slip suspensions.

Having thus described our invention in detail by way of numerous embodiments thereof in the foregoing specification, we claim:

1. The method of producing a vitrified coating on a metallic substrate comprising the steps of:
   (A) milling, in a liquid medium, a predominantly fritted slip suspension of 100 parts of a vitreous enamel ground coat frit containing adherence-promoting oxides, said slip containing at least one electrolyte, in an amount from about 1/64 to about 1.0 part by weight, based upon the weight of the total frit contained in said suspension, selected from the class consisting of:
   potassium carbonate
   potassium chloride
   potassium nitrate
   sodium carbonate
   sodium chloride
   sodium nitrate
   sodium aluminate
   sodium nitrite
   potassium nitrite
   sodium acetate
   potassium acetate
   sodium chlorate
   potassium chlorate
   urea
   magnesium carbonate
   barium carbonate
   barium chloride
   borax
   magnesium sulphate
   calcium chloride
   calcium carbonate
   barium sulphate
   said slip having contained therein from about 1/8 part to about 7 parts by weight, based upon the weight of said frit, of zinc oxide, said slip suspension milled substantially free of clay.
   (B) applying the slip derived from step A, substantially unaltered as to clay and zinc oxide content, directly to a base metal substrate, and
   (C) firing said slip to a vitrified coating on said substrate.

2. The method of producing a vitrified coating on a metallic substrate comprising the steps of:

(A) milling, in a liquid medium, a predominantly vitreous fritted slip suspension of 100 parts of a vitreous enamel ground coat frit containing adherence-promoting oxides, said slip containing at least one electrolyte, in an amount from about 1/64 to about 1.0 part by weight, based upon the weight of the total frit contained in said suspension, selected from the class consisting of:

potassium carbonate
 potassium chloride
 potassium nitrate
 sodium carbonate
 sodium chloride
 sodium nitrate
 sodium aluminate
 sodium nitrite
 potassium nitrite
 sodium acetate
 potassium acetate
 sodium chlorate
 potassium chlorate
 urea
 magnesium carbonate
 barium carbonate
 barium chloride
 borax
 magnesium sulphate
 calcium chloride
 calcium carbonate
 barium sulphate said slip having contained therein from about 1/8 part to about 7 parts by weight, based upon the weight of said frit, of zinc oxide, and from about 0 to about 3.5 parts by weight clay, based upon the weight of said frit, said zinc oxide present in an amount greater than said clay, (B) applying the slip derived from step A, substantially unaltered as to clay and zinc oxide content, directly to a base metal substrate, and (C) firing said slip to a vitrified coating on said substrate.

3. The method of producing a vitrified coating on a metallic substrate comprising the steps of:

(A) milling, in a liquid medium, a predominantly fritted slip suspension of 100 parts of a vitreous enamel cover coat frit, said slip containing at least one electrolyte, in an amount from about 1/64 to about 1.0 part by weight, based upon the weight of the total frit contained in said suspension, selected from the class consisting of:

potassium carbonate
 potassium chloride
 potassium nitrate
 sodium carbonate
 sodium chloride
 sodium nitrate
 sodium aluminate
 sodium nitrite
 potassium nitrite
 sodium acetate
 potassium acetate
 sodium chlorate
 potassium chlorate
 urea
 magnesium carbonate
 barium carbonate
 barium chloride
 borax
 magnesium sulphate
 calcium chloride
 calcium carbonate
 barium sulphate said slip having contained therein from about 1/8 part to about 7 parts by weight, based upon the weight of said frit, of zinc oxide, said slip suspension milled substantially free of clay, (B) applying the slip derived from step A, substantially unaltered as to clay and zinc oxide content, to a base metal substrate, and (C) firing said slip to a vitrified coating on said substrate.

4. The method of producing a vitrified coating on a metallic substrate comprising the steps of:

(A) milling, in a liquid medium, a predominantly fritted slip suspension of 100 parts of a vitreous enamel cover coat frit, said slip containing at least one electrolyte, in an amount from about 1/64 to about 1.0 part by weight, based upon the weight of the total frit contained in said suspension, selected from the class consisting of:

potassium carbonate
 potassium chloride
 potassium nitrate
 sodium carbonate
 sodium chloride
 sodium nitrate
 sodium aluminate
 sodium nitrite
 potassium nitrite
 sodium acetate
 potassium acetate
 sodium chlorate
 potassum chlorate
 urea
 magnesium carbonate
 barium carbonate
 barium chloride
 borax
 magnesium sulphate
 calcium chloride
 calcium carbonate
 barium sulphate said slip having contained therein from about 1/8 part to about 7 parts by weight, based upon the weight of said frit, of zinc oxide, and from about 0 to about 2.5 parts by weight clay, based upon the weight of said frit, said zinc oxide present in an amount greater than said clay, (B) applying the slip derived from step A, substantially unaltered as to clay and zinc oxide content, to a base metal substrate, and (C) firing said slip to a vitrified coating on said substrate.

5. The method of producing a vitrified coating on a ceramic substrate comprising the steps of:

(A) milling, in a liquid medium, a predominantly fritted slip suspension of 100 parts of a ceramic glaze frit, said slip containing at least one electrolyte, in an amount from about 1/64 to about 1.0 part by weight, based upon the weight of the total frit contained in said suspension, selected from the class consisting of:

potassium carbonate
 potassium chloride
 potassium nitrate
 sodium carbonate
 sodium chloride
 sodium nitrate
 sodium aluminate
 sodium nitrite
 potassium nitrite
 sodium acetate
 potassium acetate
 sodium chlorate
 potassium chlorate
 urea
 magnesium carbonate
 barium carbonate barium chloride
borax
magnesium sulphate
calcium chloride
calcium carbonate
barium sulphate said slip having contained therein from about ⅛ part to about 7 parts by weight, based upon the weight of said frit, of zinc oxide, said slip suspension milled substantially free of clay, (B) applying the slip derived from step A, substantially unaltered as to clay and zinc oxide content, to a ceramic substrate, and (C) firing said slip to a vitrified coating on said substrate.

References Cited by the Examiner

UNITED STATES PATENTS

| | | | |
|---|---|---|---|
| 2,662,028 | 12/1953 | Fenton | 106—48 |
| 2,711,975 | 7/1955 | Wainer et al. | 106—48 |

FOREIGN PATENTS 493,955  10/1938  Great Britain.

OTHER REFERENCES

Thomson: "The Effect of Particle Size of Zinc Oxide on the Consistency of Glaze Slips," J. American Ceramic Society, volume 12, 1929, pages 581–584.

TOBIAS E. LEVOW, *Primary Examiner.*

HELEN M. McCARTHY, *Examiner.*